(12) United States Patent
Nelson

(10) Patent No.: US 7,227,466 B2
(45) Date of Patent: Jun. 5, 2007

(54) EXPENDABLE METAL DETECTOR

(75) Inventor: Carl V. Nelson, Derwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 152 days.

(21) Appl. No.: 11/101,708

(22) Filed: Apr. 8, 2005

(65) Prior Publication Data

US 2006/0092021 A1 May 4, 2006

Related U.S. Application Data

(60) Provisional application No. 60/560,678, filed on Apr. 8, 2004.

(51) Int. Cl.
*G08B 13/24* (2006.01)

(52) U.S. Cl. ............................. 340/551; 73/167; 89/1.1; 324/332

(58) Field of Classification Search ................ 340/551, 340/572.7, 686.1; 324/326, 329, 332, 337, 324/327, 328, 334, 232; 73/167; 89/1.1
See application file for complete search history.

(56) References Cited

U.S. PATENT DOCUMENTS

| 4,021,725 | A | * | 5/1977 | Kirkland ...................... 324/326 |
| 6,026,135 | A | * | 2/2000 | McFee et al. ................ 376/159 |
| 6,853,194 | B2 | * | 2/2005 | Nelson et al. ............... 324/329 |
| 2003/0034778 | A1 | * | 2/2003 | Nelson ......................... 324/329 |
| 2004/0018644 | A1 | * | 1/2004 | Johnson et al. .............. 436/526 |

* cited by examiner

*Primary Examiner*—Brent A. Swarthout
(74) *Attorney, Agent, or Firm*—Francis A. Cooch

(57) ABSTRACT

An expendable metal detector system for facilitating the detection of improved explosive devices (IED) where the metal detector is launched toward the suspected IED and using either magnetic field sensors in a passive mode to detect magnetic anomalies or current pulses through a loop antenna in an active mode to detect eddy currents, or using both modes sequentially, detects the ferrous material in the IED. In the active mode, the loop antenna is deployed automatically after launch and impact. The signals are transmitted from the metal detector to the operator who can then take appropriate steps to neutralize the IED.

20 Claims, 4 Drawing Sheets

EXPENDABLE METAL DETECTOR

CROSS-REFERENCE TO RELATED APPLICATIONS

This application claims the benefit of U.S. Provisional Application 60/560,678, filed Apr. 8, 2004, the entire contents of which are hereby incorporated by reference as if fully set forth herein, under 35 U.S.C. §119(e).

BACKGROUND OF THE INVENTION

1. Field of the Invention

The present invention relates to metal detectors.

2. Background

Improvised explosive devices (IEDs) are a problem in some war zones. Commonly, the IED is a bomb made of any type of available ordnance, for example, a cluster of mortar shells, a single artillery shell or multiple artillery shells. The IED is usually placed next to a road and camouflaged, for example by rocks, or buried in the ground. The IED is then detonated by remote control when a vehicle drives nearby.

A need exists to detect IEDs safely, but metal detection is a short range sensing technology using conventional metal detector sensor methods such as magnetic anomaly detection (MAD) and electromagnetic induction (EMI). The problem to be solved is to detect metal from many tens of meters away to avoid an IED explosion in safety while placing a sensor near enough to the IED to permit its detection and neutralization.

SUMMARY OF THE INVENTION

Embodiments of the present invention satisfy the above-mentioned and other needs. An embodiment of the present invention includes an expendable metal detector system comprising: means for detecting metal; means for launching the means for detecting metal to a location suspected of containing metal; and means for receiving signals from the means for detecting metal.

The expendable metal detector system of the invention can include passive metal detection using magnetic anomaly detection (MAD) comprising: at least one magnetic field sensor for sensing magnetic anomalies in the earth's magnetic field; electronics for collecting signals from the magnetic field sensor; means for providing power to the electronics; means for transmitting the signals from the magnetic field sensor to the means for receiving signals; and means for analyzing and displaying the received signals to an operator indicating the presence of metal. A magnetic field sensor can be of the total field or vector magnitude type.

Alternately, the expendable metal detector system of the invention can include passive metal detection using magnetic anomaly detection (MAD) comprising: at least two magnetic field sensors in a gradiometer configuration for sensing magnetic anomalies; electronics for collecting signals from the magnetic field sensors; means for providing power to the electronics; means for transmitting the signals from the magnetic field sensors to the means for receiving signals; and means for analyzing and displaying the received signals to an operator indicating the presence of metal. Magnetic field gradiometers have higher sensitivity to magnetic anomalies and therefore have a larger range or can sense smaller metal objects compared to a single magnetometer configuration. Magnetic field sensors can be of the total field or vector magnitude type.

Instead of, or in addition to, a passive metal detector, the expendable metal detector system of the invention can include active metal detection via pulsed electromagnetic induction (EMI) technology comprising: means for generating a current pulse or a series of current pulses; and a transmitter antenna connected to the current pulse generating means for creating a magnetic field, the antenna being a coil of wire for transmitting the current pulse or series of current pulses; a receiver antenna for receiving a signal indicative of nearby metal, the receiver antenna being the same or different coil of wire used for the transmitting current means; means for amplifying and processing received signals; means for transmitting the received signals to the means for receiving signals; means for providing power to the means fro generating; and means for analyzing and displaying the received signals to the operator indicating the presence of metal.

The active metal detector of the expendable metal detector system of the invention further comprises a means for deploying the antenna comprising: antenna wire; means for storing the antenna wire before and during launch; deployment arm means connected to the antenna wire; and means for deploying the antenna arm means upon impact of the means for detecting metal thereby causing the antenna to deploy and form a coil antenna.

The invention is a low cost, expendable detector that permits detection of IEDs while keeping the operator safely removed from close proximity to the IED. Further embodiments are apparent from the description below.

BRIEF DESCRIPTION OF THE DRAWINGS

Various embodiments are described below with reference to the drawings.

FIG. 4, comprising

DETAILED DESCRIPTION OF THE PREFERRED EMBODIMENT(S)

Figure 1:
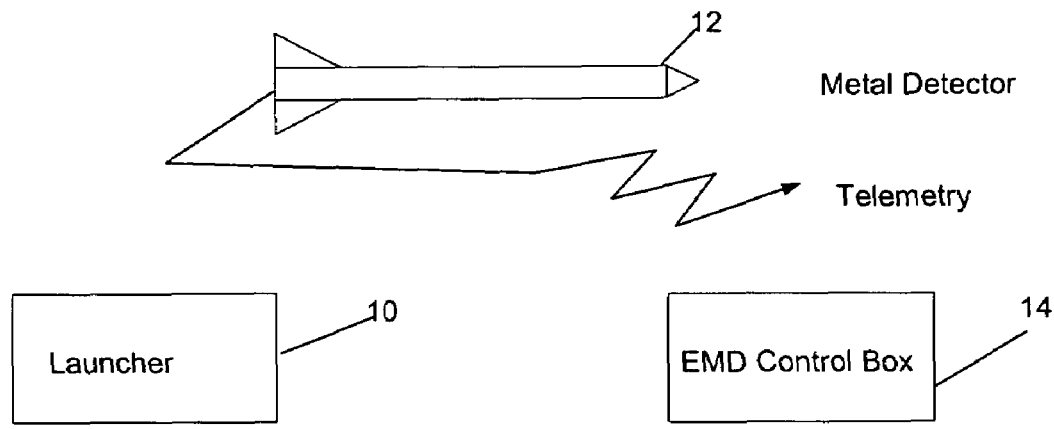
FIG. 1 illustrates an overview of the Expendable Metal Detector (EMD) of the invention.

FIG. 1 shows an overview of the Expendable Metal Detector (EMD) system of the invention. The EMD system consists of a launcher 10, a metal detector 12, and a control box 14.

The launcher propels the EMD to the location of the suspected Improvised Explosive Device (IED). By way of non-limiting example, the launcher could be a crossbow-like device, a pneumatic canon or shotgun. Also, as discussed below, the EMD could be thrown by hand by the user toward the suspected IED.

Figure 2:
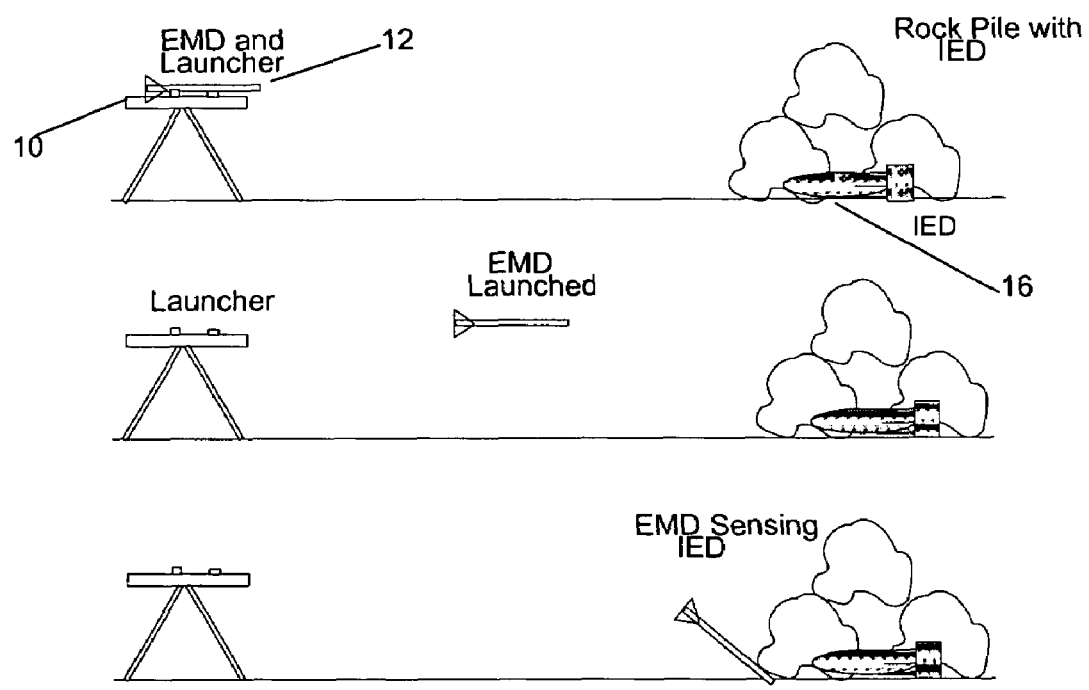
FIG. 2 illustrates one embodiment of the EMD of the invention for launching and deploying the invention.

One launch and deployment configuration is shown in FIG. 2. The EMD 12 is shot from a launcher 10 at a safe standoff distance from a location suspected of containing an IED 16, such as a pile of rocks. The EMD lands near the rock pile and begins sensing for nearby metal.

Another deployment embodiment uses the idea of a harpoon. The EMD is connected to a line or rope that is also connected to the operator's position. The EMD is fired or thrown at the location of the suspected IED. The operator can then pull on the line and drag the EMD over the ground looking for metal anomalies. This EMD method would be useful in caves, houses or other areas where potential metal booby traps may be hidden.

There are two basic EMD metal detector embodiments: passive and active metal detection. The passive metal detection embodiment uses conventional total field or vector magnetometer technology with a novel deployment configuration. The active metal detection embodiment uses conventional pulse metal detection technology with a novel deployment and mechanical sensor configuration. The control box receives signals from the EMD and shows the operator the potential for metal at the location where the EMD is sensing. It should be noted that the EMD could contain both passive and active metal detection to further enhance its capability. In this embodiment, the passive detection would be employed followed sequentially by the active detection system.

Figure 3:
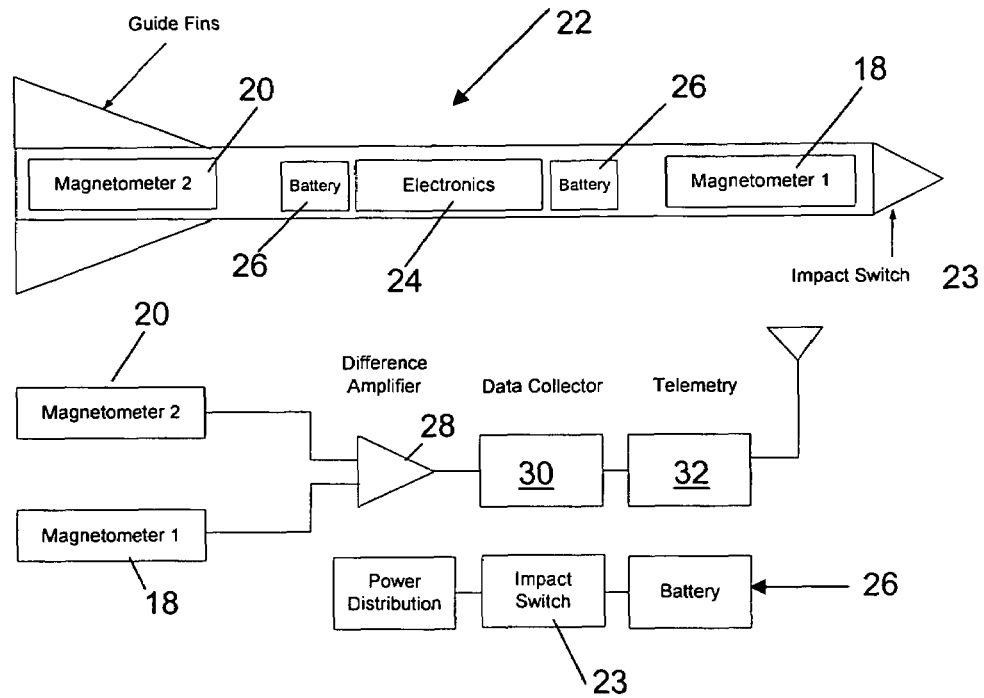
FIG. 3 illustrates a passive detection embodiment of the EMD of the invention using magnetometer gradiometers.

FIG. 3 shows a simplified diagram of the passive detection embodiment of the EMD using magnetometers 18, 20, i.e., two magnetic field sensors, to measure magnetic anomalies caused by presence of a ferrous object. Most, if not all, IED are ferrous.

To help explain the operation of the EMD, the EMD can be viewed as a metal detector sensor arrow 22. Each magnetometer is made from a magnetic field sensor such as a magnetoresistor. Once launched, an impact switch 23 in the EMD will activate the electronics 24. A low-powered electronics package amplifies the magnetic field sensor output and sends a signal back to an indicator device in the control box operated by the EMD operator.

Two magnetoresistors (MR) 18, 20 are placed in the arrow, one at each end. (Other magnetic field sensing devices such as fluxgates or Hall-effect sensors could be used. Also, two magnetic field sensing devices are not required, as the invention will work using just one.) The arrow is typically 1 to 3 feet long. The MR sensors are configured to be a gradiometric magnetic anomaly detectors as shown in FIG. 3. The electronics 24 and battery 26 can be symmetrically placed between the two magnetometers to minimize any potential adverse magnetic field distortions caused by the ferrous material in the electronics and battery.

The two MR detect the magnetic field gradient caused by the large ferrous metal content of the IED. A difference amplifier 28 measures the magnetic field anomaly and a digital data collector 30 digitizes the signal for telemetry 32 to the control box. The signal could be sent via a telemetry link of, by way of non-limiting example, radio frequency or optical or wire. The control box shows the operator the potential for metal at the EMD's location.

Figures 4A, 4B, 4C:
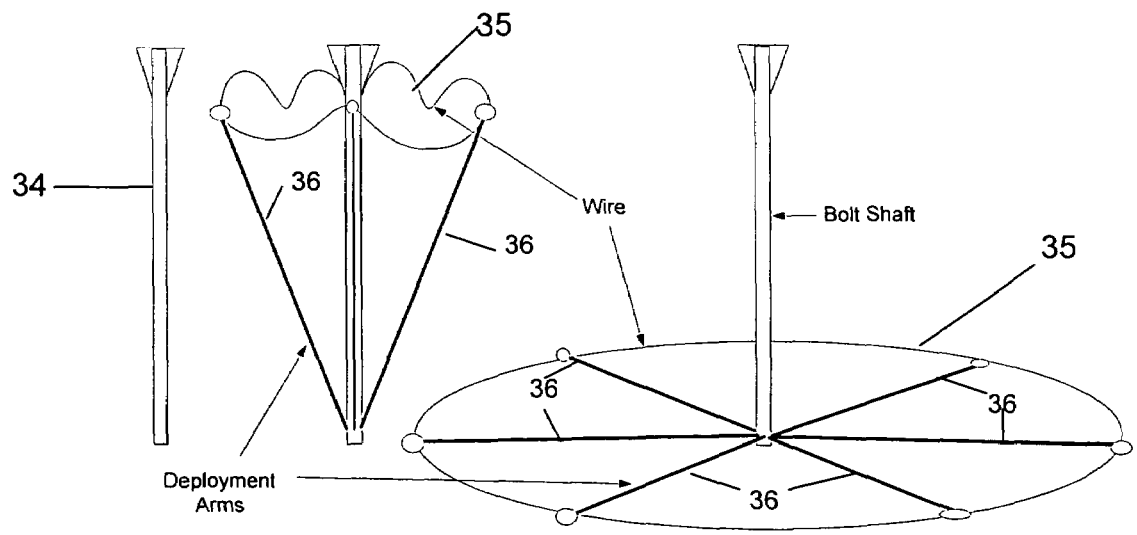
FIGS. 4A, 4B and 4C, illustrates an active detection embodiment of the EMD of the invention with self-deploying metal detector antenna: 4A—before antenna opening; 4B—during antenna opening; and 4C—antenna fully deployed.

The active metal detection embodiment of the EMD 34, shown in FIG. 4A, uses standard pulsed electromagnetic induction (EMI) metal detector technology. In this embodiment, the magnetic field sensor is a coil of wire integrated into the body of the EMD arrow as describe below and deployed upon impact.

The EMD active metal detector differs from a conventional pulsed EMI metal detector by the way the metal detection antenna is deployed. A coil of wire (antenna) 35 is deployed from the arrow as shown in FIGS. 4B and 4C via deployment arms 36. The wire loop acts as a transmitter and receiver antenna. The deployment arms could also deploy separate transmitter and receive coils as used in some conventional pulse EMI metal detectors. A current pulse or a series of current pulses are sent through the wire loop antenna. The magnetic field of the nearby metal object is sensed by the same wire loop by the appropriate electronics known in the art of metal detection. The metal signature is sent back to the operator via a telemetry link of, by way of non-limiting example, RF, optical or wire as above.

Pulse EMI metal detector technology is best suited for this embodiment compared to frequency domain techniques. Frequency domain metal detectors have very rigid requirements on the shape and stability of the sensing antenna. On the other hand, pulse or time-domain metal detectors can use almost any type of wire loop antenna for sensing large metal objects such as IEDs.

As an alternative embodiment using the deployment arms or the antenna described above, frequency domain metal detector technology could be used for the active metal detector in the EMD. However, special care would be required to decouple the primary transmitter field from the secondary receiver coil.

Figure 5:
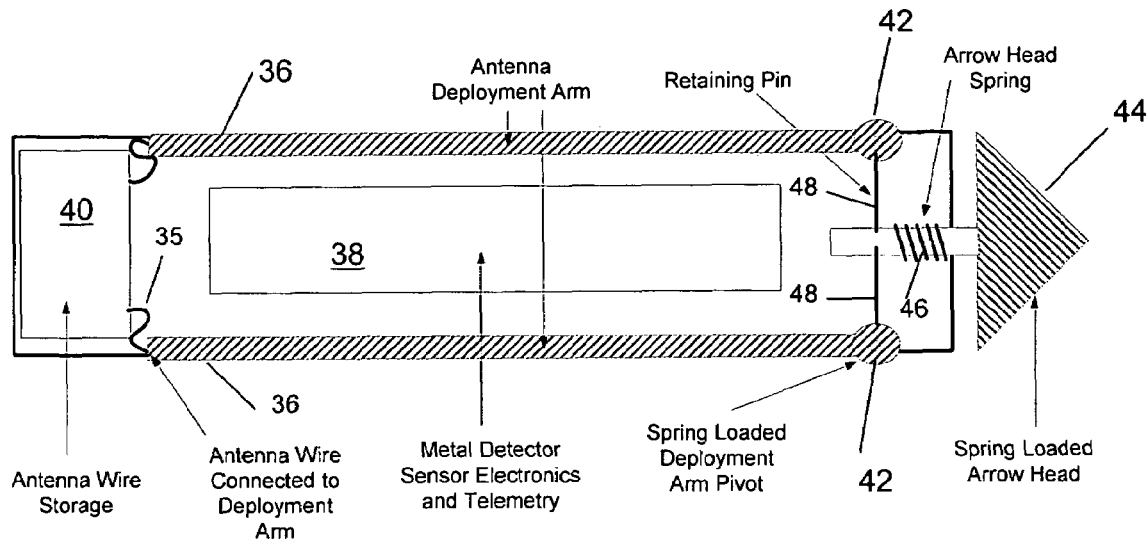
FIG. 5 illustrates the undeployed EMD of FIG. 4A in more detail.

FIG. 5 shows the detail for the active EMD "arrow" in its non-deployed state. The active EMD is composed of: active metal detector electronics (including battery) 38 connected to a wire antenna 35; metal detector wire antenna storage 40; antenna wire 35 connected to antenna deployment arms 36; antenna deployment arms connected to spring-loaded pivots 42; arrow head mounted in an extended position held in place by a spring 46; and antenna deployment arm retaining pins 48 connected to the spring-loaded arrow head.

By way of further explanation, the antenna wire used by the active metal detector embodiment is stored in a storage compartment 40 inside the arrow. The storage container could be a wire spool. When the deployment arms 36 are moved, they pull the wire antenna 35 out of the wire storage compartment 40. The antenna deployment arms 36 are connected to the body of the arrow via spring-loaded pivot points (hinges) 42. The deployment arms 36 are held in place with a restraining material (such as tape or shear pins)(not shown). In addition, retaining pins 48 prevent the hinge and springs from deploying the arms. The retaining pins are hard connected to a spring-loaded 46 arrow head plunger 44.

Figure 6:
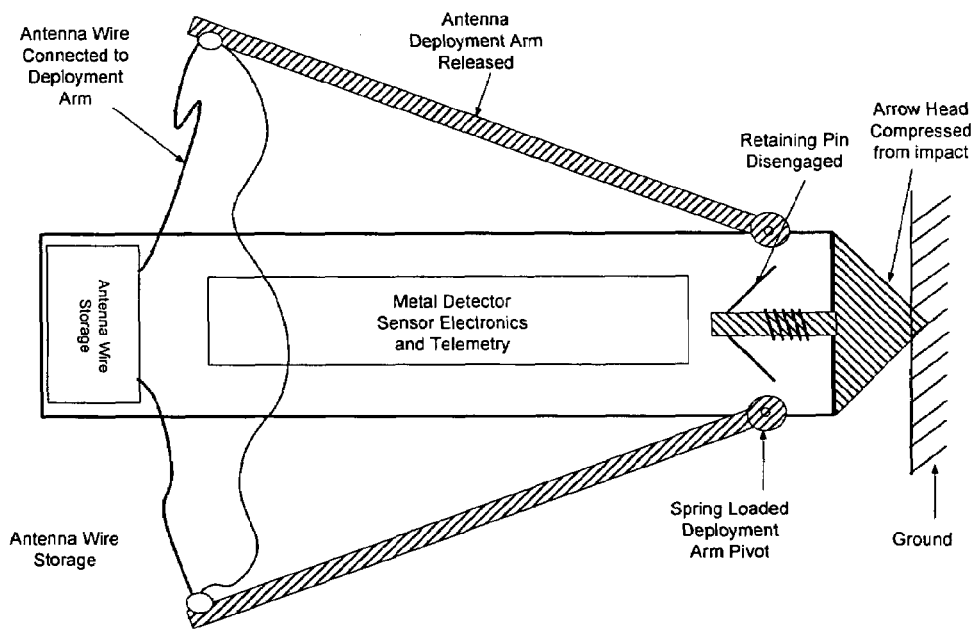
FIG. 6 illustrates the details of the deployment sequence of the antenna in the EMD of FIG. 5.

FIG. 6 shows details of the deployment sequence shown in FIG. 4. The deployment sequence is as follows:
the spring-loaded 46 arrow head 44 is compressed by impact with the ground;
the retaining pins 48 connected to the arrow head 41 disengage from the spring loaded 46 deployment arm pivot points 42 allowing the hinge and springs to open the deployment arms 36;
momentum from the impact assists the deployment arms 36 to pivot outward; and
the deployment arms 36 pull the antenna wire 35 from the wire storage compartment 40 to deploy the antenna.

As an alternative embodiment to the use of springs to deploy the deployment arms, the deployment mechanism could be a pneumatic device using, for example, a CO2 cartridge, that is activated upon impact. A piezo-electric opening means is also within the scope of the invention.

Once the antenna is deployed, the electronics are activated via an impact switch or switch connected to the deployment arm. The metal detector electronics are based on a conventional pulse EMI metal detector. The major difference is that the small battery in the arrow will power the metal detector for only a short time depending on the battery size. The metal detector pulses current through the antenna wire and metal signals are detected and the metal signature is conveyed to a digital data collector and then telemetered to the control box similar to FIG. 1.

Figure 7:
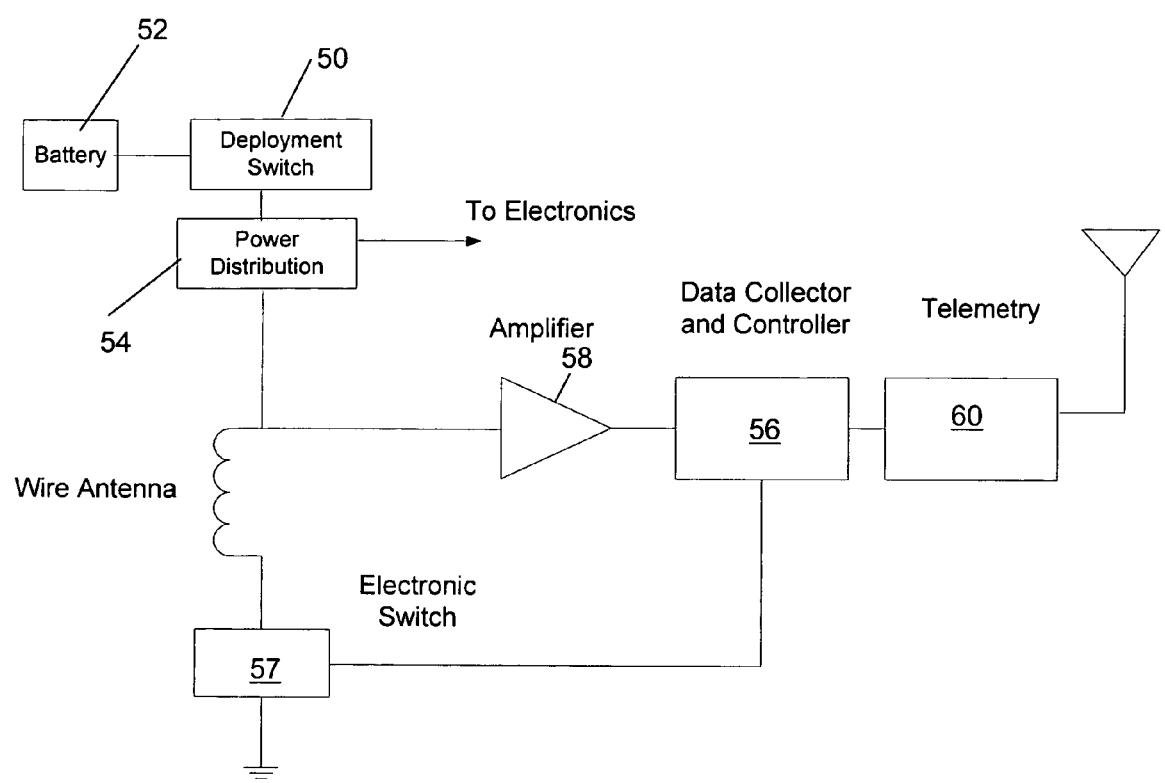
FIG. 7 illustrates a simplified block diagram of the electronics of an active detection embodiment of the EMD of the invention.

FIG. 7 shows a simplified block diagram of the EMD active metal detector electronics. The main difference between the EMD and a conventional metal detector is the addition of a deployment switch 50. When the deployment arms are deployed, a mechanical or electromechanical switch connects the battery 52 to a power distribution circuit 54. Once activated, the data controller 56 sends switching commands to the power switch 57 connected to the wire antenna. The pulses of current in the wire antenna cause eddy currents to be generated in nearby metal objects. The same wire antenna is used to sense these metal target induced currents. An amplifier 58 amplifies the signal for the digital data collector 56 to measure the presence of metal. A telemetry system 60 communicates the metal detection information back to the control box.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. An expendable metal detector system comprising:
   means for detecting metal;
   means for launching the means for detecting metal to propel the means for detecting metal from a first location to a location suspected of containing metal; and
   means for receiving signals from the means for detecting metal indicating the presence of metal;
   wherein the means for detecting metal is not attached in a fixed relationship to the means for launching.

2. The expendable metal detector system as recited in claim 1, wherein the means for detecting metal comprises a magnetic field sensor for sensing a magnetic anomaly.

3. The expendable metal detector system as recited in claim 2, wherein the magnetic field sensor is one of a total field sensor or a vector magnitude sensor.

4. The expendable metal detector system as recited in claim 1, wherein the means for detecting metal comprises a self-contained unit comprising:
   at least one magnetic field sensor for sensing magnetic anomalies;
   electronics for collecting signals from the magnetic field sensor;
   means for providing power to the electronics;
   means for transmitting the signals from the magnetic field sensor to the means for receiving signals; and
   means for analyzing and displaying the received signals to an operator.

5. The expendable metal detector system as recited in claim 4, further comprising at least two magnetic field sensors.

6. The expendable metal detector system as recited in claim 5, wherein the at least two magnetic field sensors are in a gradiometer configuration.

7. The expendable metal detector system as recited in claim 5, wherein the electronics and the power providing means are symmetrically placed between the at least two magnetic field sensors thereby minimizing any potential adverse magnetic field distortions caused by ferrous material in the electronics and power providing means.

8. The expendable metal detector system as recited in claim 4, wherein the means for transmitting signals comprises one of wire, optical, or radio frequency.

9. The expendable metal detector system as recited in claim 4, further comprising an impact switch for activating the electronics after the means for detecting metal is launched.

10. The expendable metal detector system as recited in claim 1, wherein the means for launching comprises one of a crossbow-like device, a pneumatic canon, a shotgun, or a human.

11. The expendable metal detector system as recited in claim 4, wherein the means for detecting metal is connected by a line to the means for launching allowing an operator, after the means for detecting metal is launched, to drag the means for detecting metal over the ground to search for magnetic anomalies indicating the presence of metal.

12. The expendable metal detector system as recited in claim 1, wherein the means for detecting metal comprises a self-contained unit comprising:
    means for generating a current pulse or a series of current pulses; and
    an antenna connected to the current pulse generating means, the antenna being a coil of wire for transmitting the current pulse or series of current pulses and receiving signals indicative of nearby metal.

13. The expendable metal detector system as recited in claim 12, further comprising:
    means for providing power to the means for generating;
    means for amplifying and processing the signals received by the antenna;
    means for transmitting the signals to the means for receiving signals; and
    means for analyzing and displaying the received signals to an operator.

14. The expendable metal detector system as recited in claim 12, further comprising two coils of wire, a first coil for transmitting the current pulse or the series of current pulses and a second coil for receiving the signals indicative of nearby metal.

15. The expendable metal detector system as recited in claim 12, wherein the means for detecting metal further comprises a means for deploying the antenna comprising:
    antenna wire;
    means for storing the antenna wire before and during launch;
    deployment arm means connected to the antenna wire; and
    means for deploying the antenna arm means upon impact of the means for detecting metal thereby causing the antenna to deploy and form a coil antenna.

16. The expendable metal detector system as recited in claim 15, wherein the means for deploying the antenna arm means comprises:
    a spring biased front end of the means for detecting metal; and
    a retaining pin for each of the deployment arm means for preventing the deployment arm means from deploying before and during launch, each retaining pin being connected to the spring biased front end such that upon impact of the means for detecting metal, the spring biased front end compresses thereby causing each retaining pin to disengage from the deployment arm means and allowing the deployment arm means to deploy the antenna wire to form a coil.

17. The expendable metal detector system as recited in claim 16, the means for deploying the antenna arm means further comprising one of a pneumatic means or a piezo-electric means.

18. A method for detecting metal comprising the steps of:
   launching a means for detecting metal by propelling the mans for detecting metal using a means for launching from a first location to a location suspected of containing metal;
   detecting metal using the means for detecting metal; and
   receiving signals from the means for detecting metal indicative of the presence of metal;
   wherein the means for detecting metal is not attached in a fixed relationship to the means for launching.

19. The method as recited in claim 18, the detecting metal step comprising the step of sensing a magnetic anomaly using a magnetic field sensor.

20. The method as recited in claim 18, the detecting metal step comprising the steps of:
   generating an eddy current in the metal to be detected using an antenna in the form of a coil; and
   sensing the generated eddy current.

* * * * *